(12) United States Patent
Kim (10) Patent No.: US 7,355,784 B2
(45) Date of Patent: Apr. 8, 2008

(54) ELECTROPHORETIC DISPLAY

(75) Inventor: Jun-Hyung Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 37 days.

(21) Appl. No.: 11/369,683

(22) Filed: Mar. 7, 2006

(65) Prior Publication Data

US 2006/0244715 A1  Nov. 2, 2006

(30) Foreign Application Priority Data

Apr. 11, 2005  (KR) ...................... 10-2005-0029905

(51) Int. Cl.
  *G02B 26/00* (2006.01)
  *G02F 1/03* (2006.01)
(52) U.S. Cl. ...................... 359/296; 359/245
(58) Field of Classification Search ................. 359/296
  See application file for complete search history.

(56) References Cited

U.S. PATENT DOCUMENTS

| 5,961,804 | A | 10/1999 | Jacobson et al. |
| 6,486,866 | B1 | 11/2002 | Kuwahara et al. |
| 6,542,284 | B2 | 4/2003 | Ogawa |
| 6,791,655 | B2 * | 9/2004 | Enomoto et al. ........... 349/156 |
| 6,798,470 | B2 | 9/2004 | Iwanaga et al. |
| 2003/0224120 | A1 | 12/2003 | Coventry-Saylor |
| 2004/0135762 | A1 | 7/2004 | Noolandi et al. |
| 2004/0263947 | A1 | 12/2004 | Drzaic et al. |
| 2004/0263948 | A1 | 12/2004 | Lee et al. |
| 2005/0190431 | A1 * | 9/2005 | Matsuda ..................... 359/296 |
| 2005/0266590 | A1 * | 12/2005 | Roh et al. ..................... 438/22 |
| 2006/0215252 | A1 * | 9/2006 | Moriyama et al. .......... 359/296 |

FOREIGN PATENT DOCUMENTS

| JP | 2000035598 | 2/2000 |
| JP | 2000322007 | 11/2000 |
| JP | 2001324728 | 11/2001 |
| JP | 2002221918 | 8/2002 |
| JP | 2002350904 | 12/2002 |
| JP | 2003009024 | 1/2003 |
| JP | 2003156770 | 5/2003 |
| JP | 2003295235 | 10/2003 |
| JP | 2004012656 | 1/2004 |
| JP | 2004078144 | 3/2004 |
| JP | 2004271610 | 9/2004 |
| KR | 20030011098 | 2/2003 |
| KR | 1020040030815 | 4/2004 |
| KR | 1020040044449 | 5/2004 |
| KR | 1020040083923 | 10/2004 |
| KR | 1020040093059 | 11/2004 |
| KR | 1020050001367 | 1/2005 |

* cited by examiner

*Primary Examiner*—Jordan Schwartz
*Assistant Examiner*—James C Jones
(74) *Attorney, Agent, or Firm*—Cantor Colburn LLP (57) ABSTRACT

A electrophoretic display is provided, which includes a first electrode formed on a first substrate, a second electrode formed on a second substrate facing the first substrate, a plurality of partitions dividing the domain between the first and second electrodes into a plurality of domains, and a plurality of charged particles colored by one among red, green, and blue, and dispersed in each domain.

13 Claims, 7 Drawing Sheets

ELECTROPHORETIC DISPLAY

CROSS REFERENCE TO RELATED APPLICATION

This application claims priority to and the benefit of Korean Patent Application No. 10-2005-0029905, filed on Apr. 11, 2005, which is hereby incorporated by reference for all purposes as if fully set forth herein.

BACKGROUND OF THE INVENTION

1. Field of the Invention

The present invention relates to an electrophoretic display.

2. Description of the Related Art

An electrophoretic display (EPD) is a type of flat panel display device that is commonly used for displaying an electronic book. The EPD includes two panels having field-generating electrodes and a plurality of micro-capsules arranged between the panels. Each micro-capsule includes electric ink containing a plurality of white and black pigment particles that are respectively negatively and positively charged. When an electric field is applied to the micro-capsules, the white and black particles move in opposite directions to display images.

The EPD has high reflectance and high contrast regardless of a viewing angle, making reading from the EPD substantially the same as reading from a paper image. In addition, the EPD does not require polarizers, alignment layers, liquid crystal, etc., which are expensive components of a liquid crystal display.

However, since dispersing the white and black pigment particles with bi-stability in the micro-capsule is complicated, the manufacturing process and the production cost thereof are disadvantageous. Also, a separate color filter is required to display the image with full color.

SUMMARY OF THE INVENTION

The invention provides an improved electrophoretic display.

Additional features of the invention will be set forth in the description which follows, and in part will be apparent from the description, or may be learned by practice of the invention.

The present invention discloses an electrophoretic display, including a first electrode arranged on a first substrate; a second electrode arranged on a second substrate facing the first substrate; and partition dividing the region between the first electrode and the second electrode into a plurality of domains; wherein each domain comprises one type of a plurality of charged particles consisting of red charged particles, green charged particles, and blue charged particles.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It is understood that when an element or layer is referred to as being "on" or "connected to" or "connected with" another element or layer, it can be directly on or directly connected to or with the other element or layer or intervening elements or layers may be present.

In the drawings, the thickness of layers, films, and regions are exaggerated for clarity. Like numerals refer to like elements throughout. It will be understood that when an element such as a layer, film, region, or substrate is referred to as being "on" another element, the element may be directly on the other element or intervening elements may also be present. In contrast, when an element is referred to as being "directly on" another element, no intervening elements are present.

A driving principle and a structure of the EPD according to an embodiment of the invention is described below with reference to FIG. 1.

Figure 1:
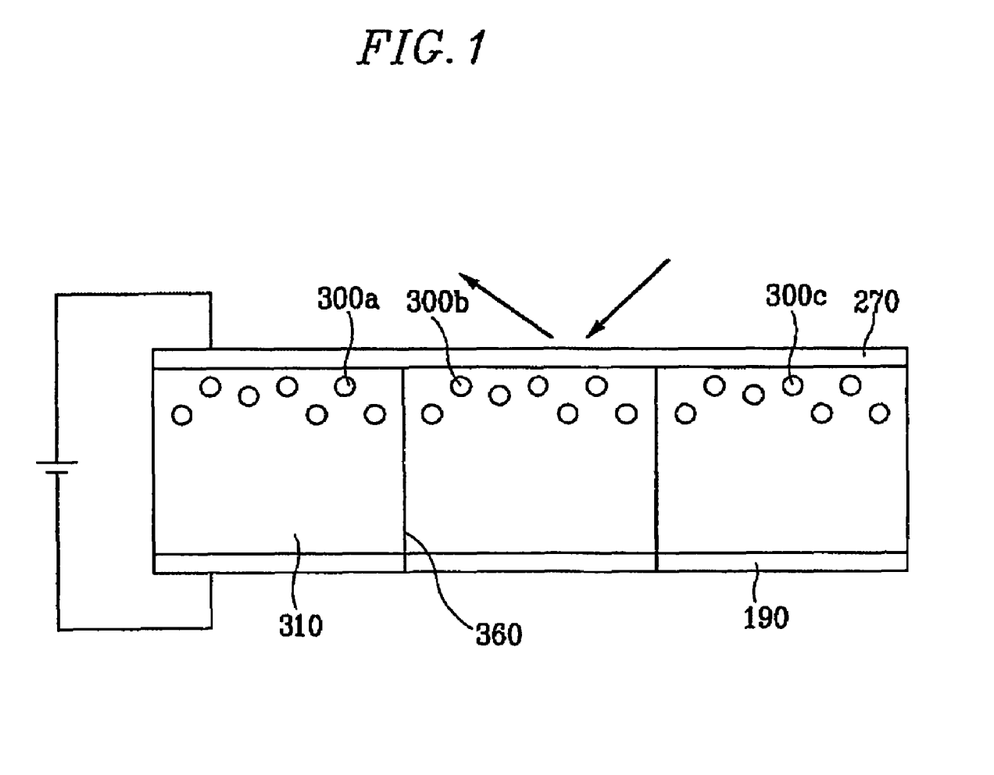
FIG. 1 is a schematic diagram showing a driving principle of an EPD according to an embodiment of the invention.

FIG. 1 is a schematic diagram showing a driving principle of an EPD according to an embodiment of the invention. Referring to FIG. 1, an EPD includes a pair of field-generating electrodes such a lower (pixel) electrode 190 and an upper (common) electrode 270, and a plurality of partitions 360 to divide the domain between the two electrodes 190 and 270 into a plurality of domains. An insulating fluid 310 and micro-capsules of electric ink having a plurality of red pigment particles 300a, green pigment particles 300b, and blue pigment particles 300c (hereafter called coloring particles) that are negatively or positively charged and successively dispersed in the insulating fluid 310 are injected or inserted in the plurality of domains.

Upon application of a voltage to the lower electrode 190 and the upper electrode 270, a voltage differences (+/−) is generated and the coloring particles 300a, 300b, and 300c that are negatively or positively charged move in opposite polarity directions to the electric surface so that a red, green, blue, and a mixed colored image thereof may be visible through light reflected by the colored particles 300a, 300b, and 300c which move along the electrode surface.

An EPD according to an embodiment of the invention is described below with reference to FIG. 2 and FIG. 3.

Figure 2:
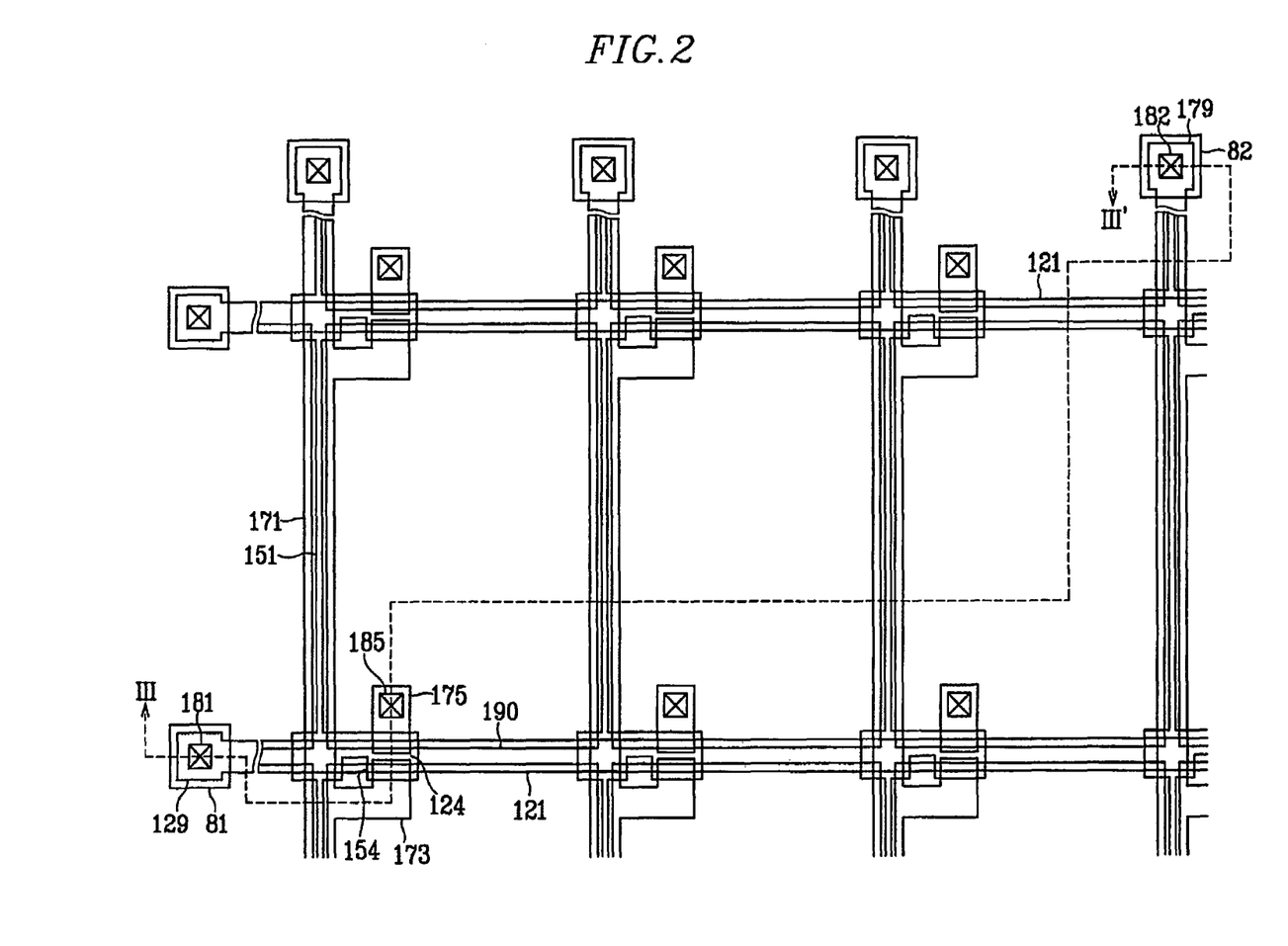
FIG. 2 is a layout view of an EPD according to an embodiment of the invention.
Figure 3:
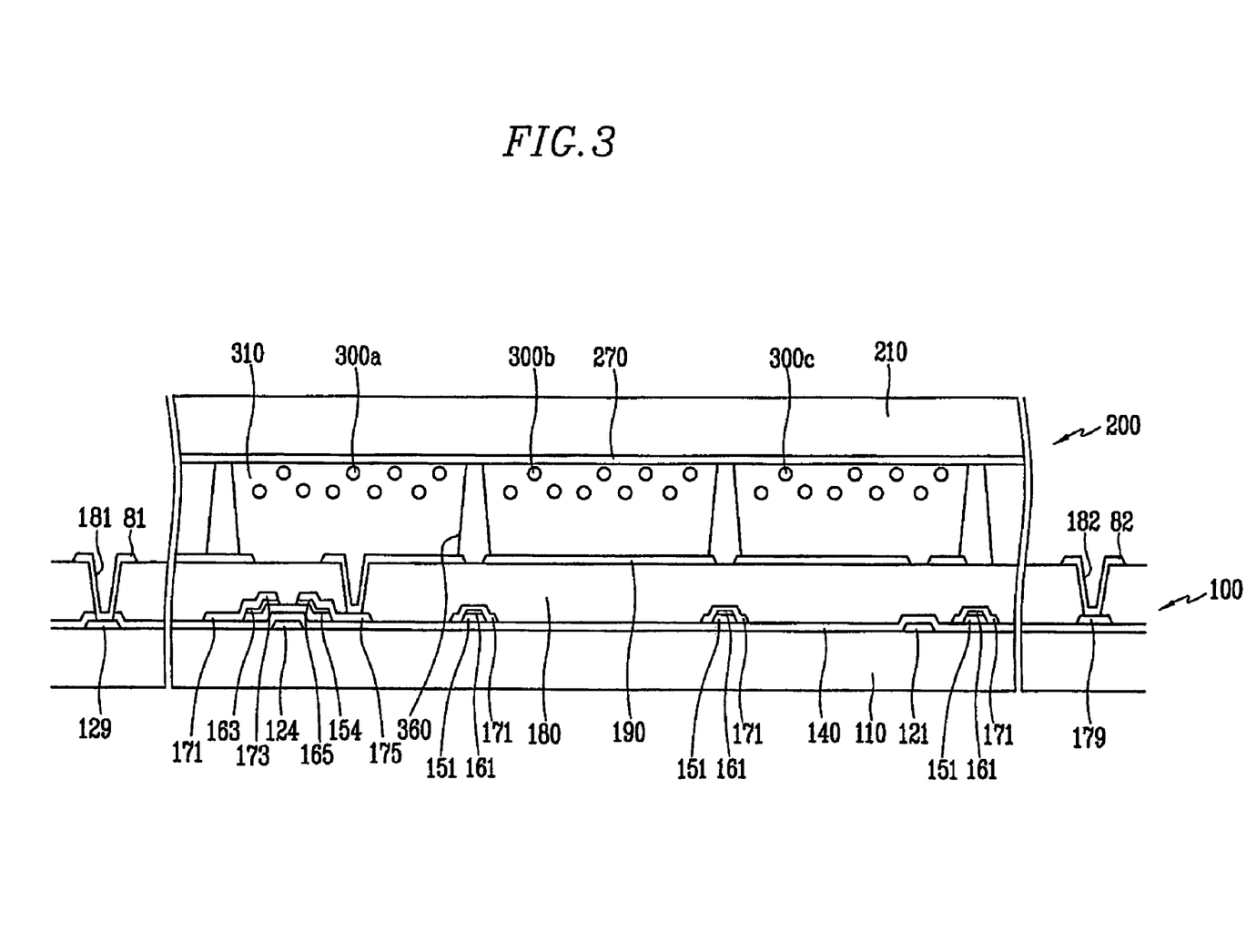
FIG. 3 is a sectional view of the EPD shown in FIG. 2 taken along the line III-III'.

FIG. 2 is a layout view of an EPD according to an embodiment of the invention. FIG. 3 is a sectional view of the EPD shown in FIG. 2 taken along the line III-III'.

An EPD includes a thin film transistor (TFT) array panel 100, a common electrode panel 200, and an insulating fluid 310 interposed between the panels 100 and 200, and includes a plurality of coloring particles 300a, 300b, and 300c which are filled in a plurality of domains defined by a plurality of partitions 360. For example, each different type of color of the coloring particles 300a, 300b and 300c is inserted in a respective domain.

A TFT array panel 100 for an EPD according to an embodiment of the invention is described below with reference to FIG. 2 and FIG. 3.

A plurality of gate lines 121 are formed on a lower insulating substrate 110.

The gate lines 121 for transmitting gate signals extend substantially in a transverse direction and are separated from each other. Each gate line 121 includes a plurality of portions forming a plurality of gate electrodes 124 and an end portion 129 having an area sufficient for contact with another layer or an external device. The end portions 129 may not be provided when a gate driving circuit (not shown) is integrated on the substrate 110 such that the gate lines 121 are in direct contact with the gate driving circuit.

The gate lines 121 may be made of an Al-containing metal such as Al and an Al alloy, an Ag-containing metal such as Ag and an Ag alloy, a Cu-containing metal such as Cu and a Cu alloy, a Mo-containing metal such as Mo and an Mo alloy, Cr, Ti, or Ta. The gate lines 121 may have a multi-layered structure including two films having different physical characteristics, i.e., a lower film (not shown) and an upper film (not shown).

The upper film may be made of a low resistivity metal including an Al-containing metal such as Al and an Al alloy, an Ag-containing metal such as Ag and an Ag alloy, or a Cu-containing metal such as Cu and a Cu alloy for reducing signal delay or voltage drop in the gate lines 121. Alternately, the lower film may be made of a material such as Cr, Mo, or an Mo alloy, which has good contact characteristics with other materials such as indium tin oxide (ITO) or indium zinc oxide (IZO).

For example, the combination of the two films may include a lower Cr film and an upper Al—Nd alloy film, or a lower Al film and an upper Mo film. However, it is understood that the gate lines 121 may be made of various other metals or conductive materials.

The lateral sides of the gate lines are inclined relative to a surface of the substrate, and the inclination angle thereof ranges about 30 to about 80 degrees.

A gate insulating layer 140, which may be made of silicon nitride (SiNx), is formed on the gate lines 121.

A plurality of semiconductor stripes 151, which may be made of hydrogenated amorphous silicon (abbreviated to "a-Si") or polysilicon, are formed on the gate insulating layer 140. Each semiconductor stripe 151 extends substantially in the longitudinal direction and includes a plurality of projections 154 extending toward the gate electrodes 124. The semiconductor stripes 151 widen near the gate lines 121 such that the semiconductor stripes 151 cover relatively large areas of the gate lines 121.

A plurality of ohmic contact stripes and islands 161 and 165, which may be made of silicide or an n+ hydrogenated a-Si heavily doped with an n-type impurity such as phosphorous, are arranged on the semiconductor stripes 151. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range of between about 30 to about 80 degrees.

A plurality of data lines 171 and a plurality of drain electrodes 175 separated from the data lines 171 are arranged on the ohmic contacts 161 and 165 and the gate insulating layer 140.

The data lines 171 for transmitting data voltages extend substantially in the longitudinal direction and cross the gate lines 121 at approximate right angles. Each data line 171 includes an end portion 179 having an area sufficient for contact with another layer or an external device. Each data line 171 includes a plurality of source electrodes 173 extending toward the drain electrodes 175. The end portions 179 may not be necessary when a data driving circuit (not shown) is integrated on the substrate 110 because the data lines 171 are in direct contact with the gate driving circuit.

Each set of a gate electrode 124, a source electrode 173, a drain electrode 175, and a projection 154 of a semiconductor stripe 151 form a TFT having a channel formed in the semiconductor projection 154 arranged between the source electrode 173 and the drain electrode 175.

The data lines 171 and the drain electrodes 175 may be made of a refractory metal such as Cr, Mo, Ti, Ta, or an alloy thereof. However, they may also have a multilayered structure including a low-resistivity film (not shown) and a good-contact film (not shown). For example, the combination may include a lower Mo film, an intermediate Al film, and an upper Mo film as well as the above-described combinations of a lower Cr film and an upper Al—Nd alloy film and a lower Al film and an upper Mo film. However, it is understood that the data lines 171 may be made of other various metals or conductive materials.

Similar to the gate lines 121, the data lines 171 and the drain electrodes 175 also have tapered lateral sides, and the inclination angles thereof range from about 30 to about 80 degrees.

The ohmic contacts 161 and 165 are only arranged between the underlying semiconductor stripes 151 and the overlying data lines 171 and the overlying drain electrodes 175 thereon, and they reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are mostly narrower than the data lines 171, the semiconductor stripes 151 widen near the gate lines 121 as described above, to smooth the profile of the surface, thereby preventing disconnection of the data lines 171.

A passivation layer 180 may be formed on the data lines 171, the drain electrodes 175, and the exposed portions of the semiconductor stripes 151. The passivation layer 180 may be made of an inorganic insulator such as silicon nitride or silicon oxide, a photosensitive organic material having a good flatness characteristic, or a low dielectric insulating material having a dielectric constant lower than 4.0 such as a-Si:C:O and a-Si:O:F formed by plasma enhanced chemical vapor deposition (PECVD). The passivation layer 180 may have a double-layered structure including a lower inorganic film and an upper organic film.

The passivation layer 180 includes a plurality of contact holes 182 and 185 exposing the end portions 179 of the data lines 171 and the end portions of the drain electrodes 175, respectively. The passivation layer 180 and the gate insulating layer 140 have a plurality of contact holes 181 exposing the end portions 129 of the gate lines 121.

A plurality of pixel electrodes 190 and a plurality of contact assistants 81 and 82, which may be made of a transparent conductor such as ITO or IZO or a reflective conductor such as Ag or Al, are arranged on the passivation layer 180.

The pixel electrodes 190 are physically and electrically coupled with the drain electrodes 175 through the contact holes 185 so that the pixel electrodes 190 receive the data voltages from the drain electrodes 175.

The contact assistants 81 and 82 are coupled with the end portions 129 of the gate lines 121 and the end portions 179 of the data lines 171 through the contact holes 181 and 182, respectively. The contact assistants 81 and 82 protect the end portions 129 and 179 and improve adhesion of the end portions 129 and 179 and external devices.

The common electrode panel 200 is described below with reference to FIG. 3.

A common electrode 270, which may be made of a transparent conductive material such as ITO and IZO, is arranged on an upper insulating substrate 210 such as transparent glass.

A plurality of partitions 360 to divide the domain between the two panels 100 and 200 into a plurality of domains are formed between the lower panel 100 and the upper panel 200. The partitions 360 may be made of an organic insulating material and may overlap the data lines 171 to improve the aperture ratio of pixels. According to this embodiment, the partitions 360 are of a column type, however the partitions 360 may be formed of various shapes and made with different materials.

An insulating fluid 310 and micro-capsules of electric ink containing a plurality of coloring particles 300a, 300b, and 300c that are negatively or positively charged and are successively dispersed in the insulating fluid 310 are inserted into the plurality of domains divided by the partitions 360 between the lower panel 100 and the upper panel 200. The insulating fluid 310 is a medium that disperses the plurality of coloring particles 300a, 300b, and 300c, and it is preferable that the insulating fluid 310 has a sufficiently low viscosity and a sufficient dielectric constant such that the plurality of coloring particles 300a, 300b, and 300c move smoothly.

A plurality of coloring particles 300a, 300b, and 300c that are negatively or positively charged and represent one of the primary colors such as red, green, and blue colors are dispersed in the insulating fluid 310. The coloring particles 300a, 300b, and 300c of the neighboring pixel regions represent different colors from each other. For example, as shown in FIG. 3, when considering the three successive pixel regions, a plurality of red coloring particles 300a are inserted in the first pixel region, a plurality of blue coloring particles 300b are filled in the second pixel region, and a plurality of blue coloring particles 300c are inserted in the third pixel region.

According to an embodiment of the invention, organic pigments of red, green, and blue are colored on the plurality of white particles made of titanium dioxide (TiO2) to form the coloring particles 300a, 300b, and 300c. The coloring particles 300a, 300b, and 300c have a sufficiently high colloidal stability in insulating fluid 310 such that they do not conglomerate.

As described above, because the coloring particles 300a, 300b, and 300c are dispersed in the insulating fluid 310 of the EPD, a full color image may be visible through the light reflected by the colored particles 300a, 300b, and 300c which are arranged on the common electrode panel 200 upon application of voltages. Accordingly, a separate color filters is not necessary.

An EPD according to another embodiment of the invention is described below with reference to FIG. 4.

Figure 4:
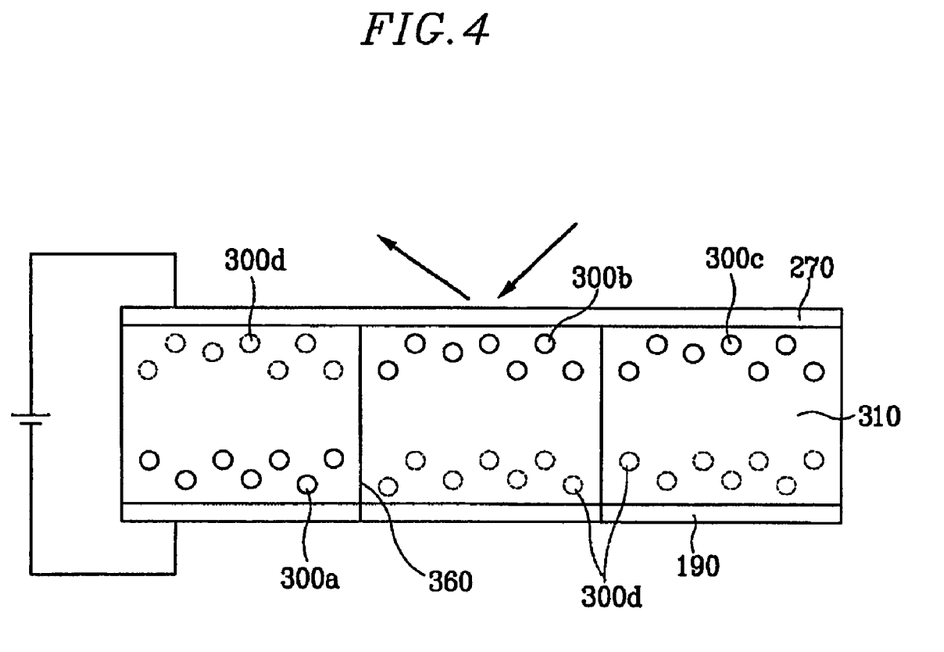
FIG. 4 is a schematic diagram showing a driving principle of an EPD according to another embodiment of the invention.

Referring to the embodiment shown in FIG. 4, an EPD includes a pair of field-generating electrodes such a lower electrode 190 and an upper electrode 270, a plurality of partitions 360 to divide the domain between the two electrodes 190 and 270 into a plurality of domains, an insulating fluid 310 inserted or injected into each domain, and a plurality of red pigment particles 300a, green pigment particles 300b, and blue pigment particles 300c (hereafter called coloring particles) that are negatively or positively charged and that are successively dispersed in the insulating fluid 310 of each domain. For example, each domain has only one color of coloring particles. Furthermore, the EPD may include a plurality of black particles 300d filled in each domain in which the red, green, and blue pigment particles 300a, 300b, and 300c are filled. The black particles 300d have an opposite polarity of the red, green, and blue pigment particles 300a, 300b, and 300c.

Upon application of voltages to the electrodes 190 and 270, the coloring particles 300a, 300b, and 300c, and the black particles 300d, which are negatively or positively charged, move along surface of the opposite polarity electrode. At this time, the coloring particles 300a, 300b, and 300c, and the black particles 300d move in opposite directions and are not mixed together because they have opposite polarities. For example, when the coloring particles 300a of a unit region move along the lower electrode 190 through the electrophoretic phenomenon, the black particles 300d having the opposite polarity of the coloring particles 300a move on the upper electrode 270. Accordingly, the contrast ratio of the image is improved because a black color through the light that is reflected by the black particles 300d may be fully imaged.

An EPD according to another embodiment of the invention is described below with reference to FIG. 5 and FIG. 6.

Figure 5:
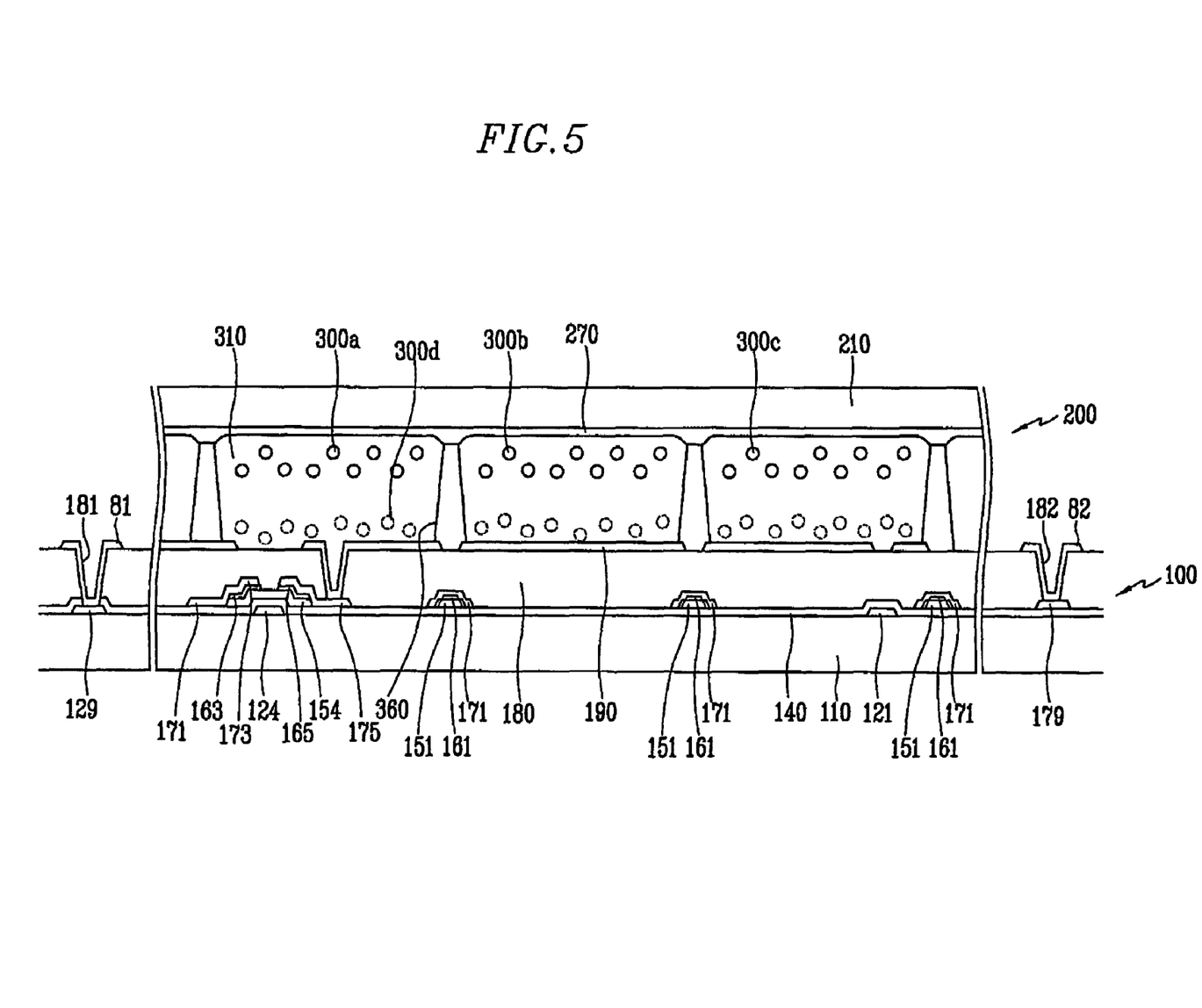
FIG. 5 and FIG. 6 are sectional views of an EPD according to other embodiments of the invention.
Figure 6:
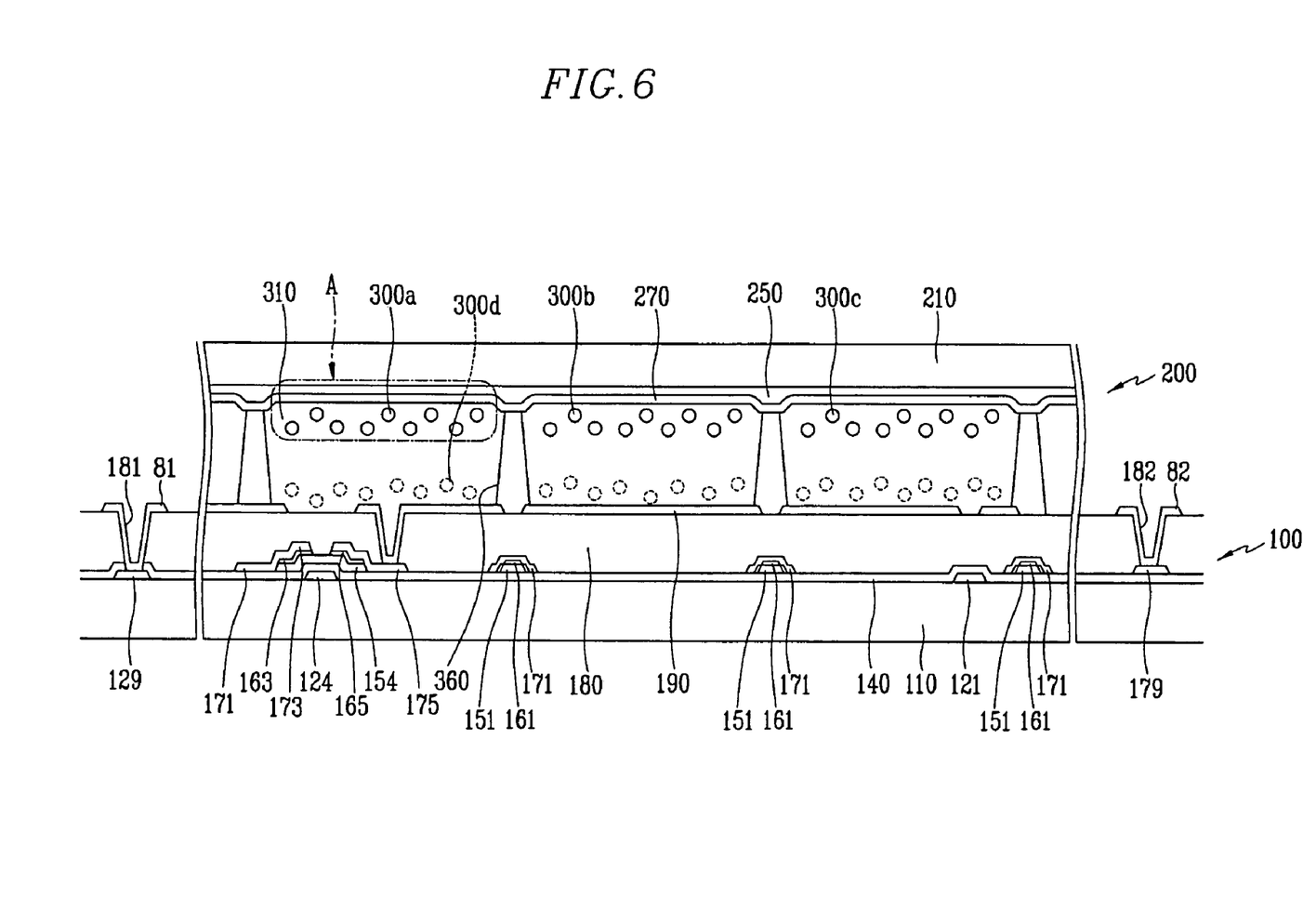

FIG. 5 and FIG. 6 are sectional views of an EPD according to another embodiment of the invention.

Referring to the embodiment shown in FIG. 5 and FIG. 6, an EPD includes a thin film transistor (TFT) array panel 100, a common electrode panel 200, and a plurality of domains arranged between the TFT array panel 100 and the common electrode panel 200.

A plurality of gate lines 121 are formed on a lower insulating substrate 110 of the TFT array panel 100.

The gate lines 121 for transmitting gate signals extend substantially in a transverse direction and are separated from each other. Each gate line 121 includes a plurality of portions forming a plurality of gate electrodes 124 and an end portion 129 having an area sufficient for contact with another layer or an external device. The end portions 129 may not be provided when a gate driving circuit (not shown) is integrated on the substrate 110 because the gate lines 121 are already in direct contact with the gate driving circuit.

A gate insulating layer 140, which may be made of silicon nitride (SiNx), is arranged on the gate lines 121.

A plurality of semiconductor stripes 151, which may be made of hydrogenated amorphous silicon (abbreviated to "a-Si") or polysilicon, are arranged on the gate insulating layer 140. Each semiconductor stripe 151 extends substantially in the longitudinal direction and includes a plurality of projections 154 extending toward the gate electrodes 124.

A plurality of ohmic contact stripes and islands 161 and 165, which may be made of silicide or n+ hydrogenated a-Si heavily doped with an n-type impurity such as phosphorous, are arranged on the semiconductor stripes 151. Each ohmic contact stripe 161 includes a plurality of projections 163, and the projections 163 and the ohmic contact islands 165 are located in pairs on the projections 154 of the semiconductor stripes 151.

A plurality of data lines 171 and a plurality of drain electrodes 175 separated from the data lines 171 are arranged on the ohmic contacts 161 and 165 and the gate insulating layer 140.

The data lines 171 for transmitting data voltages extend substantially in the longitudinal direction and cross the gate lines 121 at substantially right angles. Each data line 171 includes an end portion 179 having an area sufficient for contact with another layer or an external device. Each data line 171 includes a plurality of source electrodes 173 extending toward the drain electrodes 175. The end portions 179 may not be provided when a data driving circuit (not shown) is integrated on the substrate 110 because the data lines 171 are already in direct contact with the gate driving circuit.

Each set of a gate electrode 124, a source electrode 173, a drain electrode 175, and a projection 154 of a semiconductor stripe 151 form a TFT having a channel formed in the semiconductor projection 154 arranged between the source electrode 173 and the drain electrode 175.

A passivation layer 180 is provided on the data lines 171, the drain electrodes 175, and the exposed portions of the semiconductor stripes 151. The passivation layer 180 may be made of an inorganic insulator such as silicon nitride or silicon oxide, a photosensitive organic material having a good flatness characteristic, or a low dielectric insulating material having a dielectric constant that is lower than 4.0 such as a-Si:C:O and a-Si:O:F formed by plasma enhanced chemical vapor deposition (PECVD). The passivation layer 180 may be multi-layered structure such as a double-layered structure having a lower inorganic film and an upper organic film.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181 exposing the end portions 129 of the gate lines 121.

A plurality of pixel electrodes 190, and a plurality of contact assistants 81 and 82, which may be made of a transparent conductor such as ITO or IZO or a reflective conductor such as Ag or Al, are arranged on the passivation layer 180.

The pixel electrodes 190 are physically and electrically coupled with the drain electrodes 175 through the contact holes 185 so that the pixel electrodes 190 receive the data voltages from the drain electrodes 175.

The contact assistants 81 and 82 are coupled with the end portions 129 of the gate lines 121 and the end portions 179 of the data lines 171 through the contact holes 181 and 182, respectively. The contact assistants 81 and 82 function to protect the end portions 129 and 179 and improve adhesion between the end portions 129 and 179 and external devices.

A common electrode panel 200 facing the TFT panel 100 may include an upper insulating substrate 210 and a common electrode 270, which may be made of a transparent conductive material such as ITO and IZO and arranged on an upper insulating substrate 210 such as transparent glass.

As shown in FIG. 5, the common electrode 270 may include a plurality of concave or recessed portions.

According to the embodiment shown in FIG. 6, a common electrode panel 200 facing the TFT panel 100 includes an upper insulating substrate 210, an overcoat 250 having raised portions and recessed portions and repeatedly formed on the upper insulating substrate 210, and a common electrode 270 that may be made of a transparent conductive material such as ITO and IZO and is arranged on the overcoat 250. A photosensitive organic material is coated on the upper insulating substrate 210 to form the overcoat 250. The overcoat 250 is exposed using a photo-mask and developed to repeatedly form raised portions and recessed portions, such that the overcoat 250 has a plurality of concaves in every pixel domain.

As described above, because the common electrode 270 or the overcoat 250 of the common electrode panel 200 have concaves in every pixel domain, the viewing angle may be improved.

A plurality of partitions 360 dividing the domain between the two panels 100 and 200 into a plurality of domains are arranged between the TFT panel 100 and the common electrode panel 200.

A plurality of pixel domains defined by a plurality of partitions 360 include a plurality of coloring particles 300a, 300b, and 300c, and a plurality of black particles 300d, which are dispersed in the insulating fluid 310 and are negatively or positively charged. The insulating fluid 310 is a medium that disperses the coloring particles 300a, 300b, and 300c, and the black particles 300d. Accordingly, the insulating fluid 310 may have a low enough viscosity and a sufficient dielectric constant so that the coloring particles 300a, 300b, and 300c and the black particle move smoothly.

Because the black particles 300d are charged with opposite polarities to the coloring particles 300a, 300b, and 300c, the coloring particles 300a, 300b, and 300c, and the black particles 300d move in opposite directions. For example, when the coloring particles 300a of a unit region move along the lower electrode 190 through the electrophoretic phenomenon, the black particles 300d having the opposite polarity of the coloring particles 300a move along the upper electrode 270. Therefore, the contrast ratio may be improved because a black color through the light reflected by the black particles 300d may be fully imaged.

Figure 7:
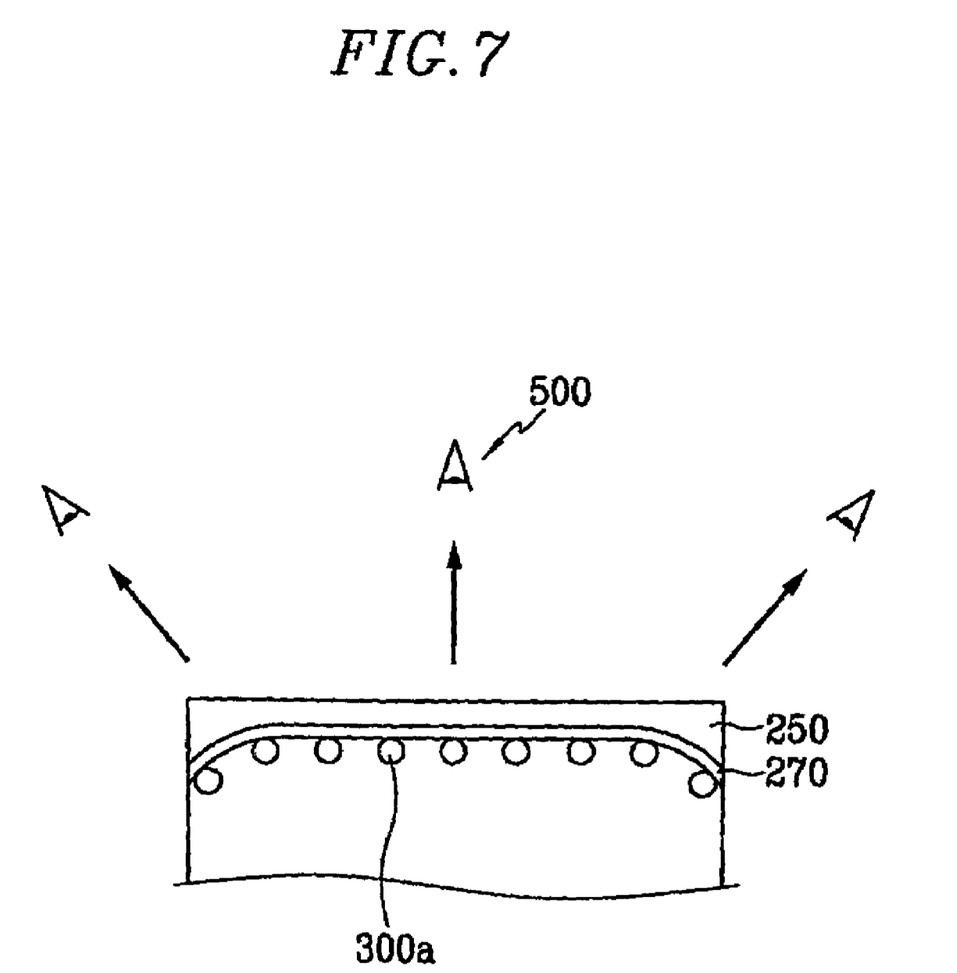
FIG. 7 is a sectional view showing an enlarged pixel in the EPD of FIG. 6 on application of the electrode field.

FIG. 7 is a sectional view showing an enlarged pixel in the A portion of the EPD shown in FIG. 6 when an electrode field is applied thereto.

When a voltage is applied to the pixel electrode 190 and the common electrode 270, the coloring particles 300a having the opposite polarity of the common electrode 270 move along the surface of the common electrode 270, and are distributed along the concave surface of the common electrode 270. Accordingly, an image may be seen by an observer 500 through the light reflected by the coloring particles 300a in the side direction as well as the front direction, such that the viewing angle may be improved.

The embodiments described above are directed to an active driving type of display apparatus that uses the thin film transistor having the embodiments may be adapted to a passive driving type that uses two electrodes crossing each other.

As described above, the coloring particles are dispersed in the domains defined by the partitions, such that the full color image may be displayed without additional processes or a separate color filter. Also, the contrast ratio and the viewing angle may be improved, because the EPD uses the black particles with the coloring particles, and the common electrode has the concave portions.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrophoretic display, comprising:
   a first electrode arranged on a first substrate;
   a second electrode arranged on a second substrate facing the first substrate;
   a partition dividing a region between the first electrode and the second electrode into a plurality of domains;
   a gate line arranged on the first substrate; and
   a data line intersecting the gate line and arranged on the first substrate;
   a thin film transistor coupled with the gate line and the data line;
   wherein each domain comprises one type of a plurality of charged particles consisting of red charged particles, green charged particles, and blue charged particles; and
   wherein the partition is arranged on the data line.

2. The electrophoretic display of claim 1, wherein adjacent domains contain a different type of the plurality of charged particles.

3. The electrophoretic display of claim 1, further comprising:
   a plurality of black charged particles dispersed in each domain.

4. The electrophoretic display of claim 3, wherein the black particles are charged with opposite polarities as the polarities of the red charged particles, green charged particles, and blue charged particles.

5. The electrophoretic display of claim 1, wherein the first electrode is divided into a plurality of portions corresponding to the plurality of domains.

6. The electrophoretic display of claim 1, further comprising:
   a passivation layer provided between the thin film transistor and the first electrode.

7. The electrophoretic display of claim 1, wherein a center portion of the second electrode is recessed in each domain.

8. An electrophoretic display comprising:
   a first electrode arranged on a first substrate;
   a second electrode arranged on a second substrate facing the first substrate;
   a partition dividing a region between the first electrode and the second electrode into a plurality of domains; and
   an overcoat arranged between the second electrode and the second substrate;
   wherein each domain comprises one type of a plurality of charged particles consisting of red charged particles, green charged particles, and blue charged particles; and
   wherein a center portion of the overcoat is recessed in each domain.

9. The electrophoretic display of claim 1, further comprising:
   a fluid in each domain that includes the charged particles.

10. The electrophoretic display of claim 9, wherein the second electrode comprises a plurality of recessed portions.

11. The electrophoretic display of claim 10, wherein the recessed portions correspond to each domain.

12. The electrophoretic display of claim 10, further comprising:
   an overcoat provided between the second electrode and the second substrate and having raised portions and recessed portions,
   wherein the recessed portions of the second electrode are arranged according to the raised portions and the recessed portions of the overcoat.

13. The electrophoretic display of claim 8, wherein the second electrode comprises a plurality of recessed portions; and
   wherein the recessed portions of the second electrode are arranged according to the recessed portions of the overcoat.

* * * * *